US012623385B2

(12) United States Patent
     Halford

(10) Patent No.: US 12,623,385 B2
(45) Date of Patent: May 12, 2026

(54) MOULD TOOL, METHOD OF ASSEMBLING A MOULD TOOL AND METHOD OF MANUFACTURE USING A MOULD TOOL

(71) Applicant: Surface Generation Limited, Rutland (GB)

(72) Inventor: Ben Halford, Rutland (GB)

(73) Assignee: Surface Generation Limited, Rutland (GB)

( * ) Notice: Subject to any disclaimer, the term of this patent is extended or adjusted under 35 U.S.C. 154(b) by 137 days.

(21) Appl. No.: 18/412,807

(22) Filed: Jan. 15, 2024

(65) Prior Publication Data

US 2024/0262023 A1        Aug. 8, 2024

Related U.S. Application Data

(63) Continuation of application No. 16/967,256, filed as application No. PCT/GB2019/050231 on Jan. 28, 2019, now abandoned.

(30) Foreign Application Priority Data

Feb. 12, 2018        (GB) ..................................... 1802246

(51) Int. Cl.
     *B29C 45/73*        (2006.01)
     *B29C 33/02*        (2006.01)
     *B29C 33/30*        (2006.01)
     *B29C 45/26*        (2006.01)
     *B29C 45/78*        (2006.01)

(52) U.S. Cl.
     CPC .......... *B29C 45/7312* (2013.01); *B29C 33/02* (2013.01); *B29C 33/306* (2013.01); *B29C 45/2675* (2013.01); *B29C 45/78* (2013.01);

*B29C 2045/7343* (2013.01); *B29C 2945/7604* (2013.01); *B29C 2945/7626* (2013.01); *B29C 2945/76454* (2013.01); *B29C 2945/76531* (2013.01); *B29C 2945/76739* (2013.01)

(58) Field of Classification Search
     None
     See application file for complete search history.

(56) References Cited

U.S. PATENT DOCUMENTS

| | | | | | |
|---|---|---|---|---|---|
| 5,423,670 | A | * | 6/1995 | Hamel | B29C 45/7312 |
| | | | | | 264/40.6 |
| 6,173,756 | B1 | * | 1/2001 | Fehlemann | B22D 11/055 |
| | | | | | 164/443 |
| 2002/0162940 | A1 | * | 11/2002 | Frul | B29C 45/73 |
| | | | | | 249/79 |
| 2014/0178518 | A1 | * | 6/2014 | Cook | B29C 45/376 |
| | | | | | 425/183 |
| 2015/0190947 | A1 | * | 7/2015 | Halford | B29C 33/04 |
| | | | | | 264/319 |

* cited by examiner

*Primary Examiner* — Abbas Rashid
*Assistant Examiner* — Gregory C. Grosso
(74) *Attorney, Agent, or Firm* — YOUNG LAW FIRM, P.C.

(57)        ABSTRACT

A mould tool (100) is provided which has a multipart mould layer assembly (200; 300; 400; 500; 600) which may either be formed from a carrier (202; 302; 402; 502) and an insert (206; 306; 406; 506) defining a mould profile, or a mould face component (602; 702) having a plurality of stackable blocks (630, 632, 634) which can be assembled to form a mould layer.

13 Claims, 14 Drawing Sheets

200

702

708

MOULD TOOL, METHOD OF ASSEMBLING A MOULD TOOL AND METHOD OF MANUFACTURE USING A MOULD TOOL

The present invention is concerned with a mould tool, a method of assembling such a mould tool and a method of manufacturing moulded parts using a mould tool. More specifically, the present invention is concerned with a mould tool having multiple parts which can be independently manufactured and assembled to form the tool such that at least some parts of the mould tool can be re-used to mould parts having different geometries.

Mould tools for the heating and cooling of a part located in a mould cavity are well known. The applicant of the present application has filed prior patent applications to such tools.

WO2011/048365 is directed to a tool and method of moulding in which fluid is directed at the back of a mould face to heat and cool the face, and hence the workpiece material. The tool is separated into a number of tessellated zones across the workpiece, each of which can be independently controlled to produce the workpiece according to a functional specification.

WO2013/021195 is directed to a mould tool which uses the same heating and cooling principle of WO2011/048365 but is separated into a number of layers. There is a provided a mould layer which has a mould surface defined on a first side (against which the workpiece is formed) and a temperature control surface defined on the opposite side. A plurality of chambers are defined which are partially delimited by the temperature control surface. There is also provided an exhaust layer adjacent the mould layer, and a utilities layer adjacent the exhaust layer. Thermal control assemblies and thermocouples extend from the utilities layer, through the exhaust layer and into the mould layer. The thermal control assemblies direct heating and cooling air at the temperature control face of the mould layer to heat or cool it. The used air flows back into the exhaust layer and exits the tool. The thermocouples extend into contact with the temperature control surface. A controller can heat or cool each zone to match a desired temperature profile of the tool surface and therefore workpiece.

WO2014/023942 is directed to a similar mould tool to WO2011/048365, and a further improvement in which arches are defined on the temperature control face. The arches are used to improve the general structural rigidity of the mould layer, to direct the impinging air flow and to direct the moulding load through to the exhaust layer.

WO2014/023942, WO2013/021195 and WO2011/048365 are incorporated herein by reference where permitted.

It is clear that the general requirement for mould tools described above is a multi-chamber structure defining the mould face, which is thermally agile (i.e. using as little material as possible) and has some relatively fine detail formed adjacent the temperature control face.

There are two situations in which the above requirements can cause problems.

The first is when a particularly fine or high precision finish is required on the mould face. For example, small, thin and light parts may require a high precision finish. The fields of medical implants, consumer electronics and optics are good examples, in which many parts are quite "flat" (i.e. pseudo 2D or "2.5D"). The moulding of e.g. plastic lenses requires a very high precision mould surface. A problem with this is that such finishes can often only be achieved with small, high precision machining tools. It is often the case that it is impractical or impossible to machine entire mould layers to such high precision over a relatively small part of the mould surface.

"Flat" parts are often disproportionally disadvantaged in terms of cost. For simpler 2D or 2.5D profiles, a disproportionate amount of machining must be undertaken to the back face of the mould layer to form the arched ribs. This problem is exacerbated by low volume runs.

The second is that parts which are "high depth" can be problematic. The direction in which the mould tools come together is known as the depth or "Z" direction (although it may be vertical in e.g. compression moulding, or horizontal in e.g. injection moulding). These parts therefore have a high Z-dimension- or in other words have a high aspect ratio in the depth direction. Such parts are also known as "2.5D" or "3D" (i.e. they are not very flat). The exhaust layer and utilities layer of the above-described tools are typically interchangeable with a variety of tool layers. The exhaust layer presents a flat, planar face to which the mould layer is abutted. Therefore a high-depth part requires a high-depth mould layer. This means that the chambers at the areas furthers from the exhaust layer need to be very deep. This causes problems for manufacture. Machining such a mould layer from solid is problematic because it is very wasteful (and therefore expensive), and further it is difficult to machine very deep chambers. Casting such components to full depth, although more economical is also not ideal as such shapes are not well-suited to casting, and further it is still not easy to machine the required arches and geometry on the temperature control face.

In order to alleviate this, near-net-shape manufacturing techniques may be used, but such techniques are expensive and relatively underdeveloped.

More efficient processes such as 3D printing/additive layer manufacture require a near net shape approximation to maximise their performance advantage. This may or may not need to be sacrificial i.e. bonded or bolted to the front face It is an aim of the present invention to overcome, or at least mitigate, the above problems.

According to a first aspect of the invention there is provided a mould layer assembly comprising:

a carrier defining a mould contact face on a first side, and a temperature control face on a second side opposite the first, which temperature control face is separated into a plurality of temperature control zones, each zone comprising a fluid chamber at least partially defined by the temperature control surface; and, an insert defining a mould profile for forming a moulded article;

in which the insert is assembled in the carrier such that the insert overlaps at least one of the temperature control zones.

Advantageously, use of an insert allows smaller, "flat" or high precision 2.5D components to be manufactured at a much lower cost. Only the insert needs to be manufactured to the required tolerance, and the carrier can be re-used with different inserts.

Preferably the insert overlaps a plurality of the temperature control zones. More preferably the mould profile overlaps a plurality of the temperature control zones.

Preferably the insert comprises a mould contact face adjacent the mould profile, which mould contact face is parallel and adjacent to the mould contact face of the carrier.

Preferably the insert comprises an insert temperature control surface opposite the mould profile, in which the insert temperature control surface is in direct thermal contact with at least one fluid chamber.

Preferably the insert temperature control surface is in direct thermal contact with a plurality of fluid chambers.

Preferably the carrier comprises a support surface for supporting the insert. The support surface may comprise:

a peripheral support around the opening;

ends of the chamber sidewalls; and/or, ends of the ribs.

Preferably the chamber sidewalls form a rectangular lattice, and in which the ribs extend at an angle to the chamber sidewalls.

Preferably the ribs define concave formations facing away from the insert.

Preferably the ribs are arch-shaped.

Preferably a plurality of ribs extend from the chamber sidewalls to an impingement region.

Preferably the carrier comprises a support surface for supporting the insert.

Preferably carrier comprises an opening for receiving the insert, and in which the support surface covers the base of the opening.

Preferably the support surface is integral with the carrier.

The invention also provides a mould tool comprising:

a plurality of temperature control assemblies each comprising a heater; and, a mould layer assembly according to the first aspect, in which the temperature control assemblies is controllable to individually heat each of the chambers.

Preferably which the temperature control assemblies comprise a fluid outlet directed into the respective chamber.

Preferably the temperature control assemblies are configured to alternately heat and cool the chamber with fluid from the outlet.

Preferably at least one of the fluid outlets is directed towards the insert.

According to a second aspect of the invention there is provided a method of moulding an article comprising the steps of:

providing a mould tool as described above;

providing a material to be moulded in thermal contact with the mould profile; and, moulding the material to be moulded into an article.

According to a third aspect of the invention there is provided mould layer assembly comprising:

a mould face component defining a mould profile for forming an moulded article on a first side thereof, and a temperature control surface on an opposite side to the mould profile, which temperature control surface is separated into a plurality of temperature control zones, each zone comprising a fluid chamber at least partially defined by the temperature control surface; and, a plurality of support elements stacked on the temperature control surface side of the mould face component to provide a support surface for the mould layer assembly.

Advantageously, this allows high Z-variation shapes to be formed whilst mitigating the above-described problems.

Preferably the plurality of support elements comprises plural support elements extending in at least two dimensions.

More preferably the plurality of support elements comprises plural support elements extending in three dimensions.

Preferably the plurality of support elements define a flat, planar support surface distal to the mould face component.

Preferably the support elements are stacked in columns extending from the temperature control surface.

Preferably a mechanical fastener secures the elements of each column to the mould face component.

Preferably each column corresponds to at least one fluid chamber of the mould face component.

Preferably which the elements define conduits for the passage of a temperature control assembly and/or a thermocouple from the support surface to the fluid chambers.

Preferably the conduits extend normal to the support surface.

Preferably the plurality of elements comprises different shapes of element.

The invention provides a mould tool comprising a mould tool layer assembly according to the third aspect.

Preferable the mould tool comprises:

a plurality of temperature control assemblies each comprising a heater in which the temperature control assemblies are controllable to individually heat each of the chambers.

Preferably the temperature control assemblies comprise a fluid outlet directed into the respective chamber.

Preferably the temperature control assemblies are configured to alternately heat and cool the chamber with fluid from the outlet.

Preferably the tool comprises a plurality of temperature sensors in contact with the mould face component.

Preferably the plurality of temperature sensors extend from the support surface to the mould face component.

Preferably the plurality of temperature sensors are resiliently biased into contact with the mould face component.

According to a fourth aspect there is provided a method of moulding an article comprising the steps of:

providing a mould tool according as described above;

providing a material to be moulded in thermal contact with the mould profile; and, moulding the material to be moulded into an article.

According to a fifth aspect there is provided a method of manufacturing a mould layer assembly comprising the steps of:

providing a mould face component defining a mould profile for forming an moulded article on a first side thereof, and a temperature control surface on an opposite side to the mould profile, which temperature control surface is separated into a plurality of temperature control zones, each zone comprising a fluid chamber at least partially defined by the temperature control surface;

providing a plurality of support elements; and, stacking the plurality of support elements on the temperature control surface side of the mould face component to provide a support surface for the mould layer assembly.

Preferably the method comprises the step of securing the plurality of support elements using mechanical fasteners.

Preferably the method comprises the step of performing a machining operation on the contact face to level it.

Example mould tools, methods of assembly and manufacturing methods will now be described with reference to the accompanying drawings, in which.

Figure 1:
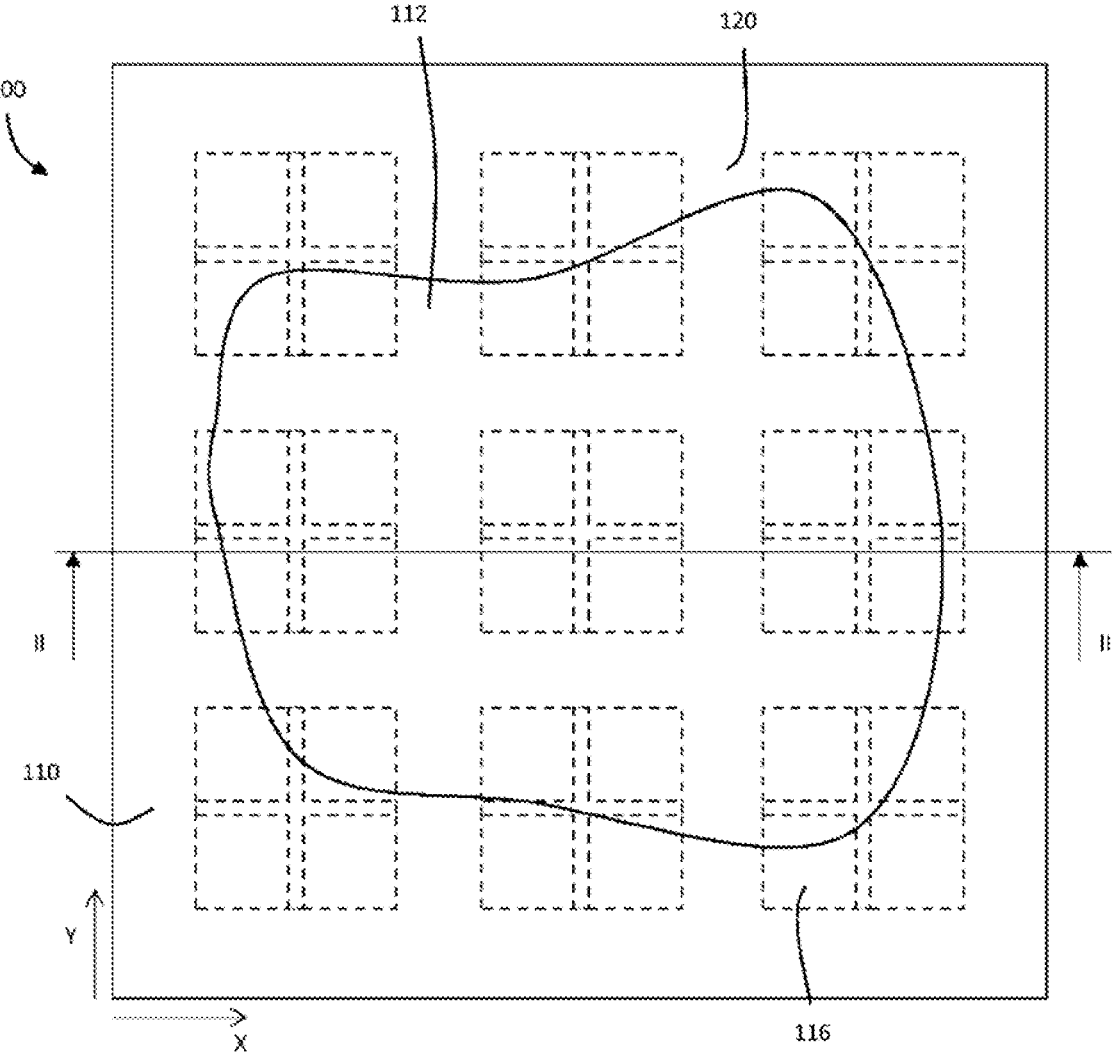
FIG. 1 is a schematic plan view of a first mould tool in accordance with the invention.

The various embodiments below are described in the context of a mould tool 100 of the type shown in FIGS. 1 and 2. The mould tool 100 is a multi-layered mould tool having fluid heating and cooling as will be described below.

The mould tool 100 generally defines an X-direction, a Y-direction and a Z-direction. These will be further defined below, but generally speaking the mould tool is defined in terms of layers which are substantially each defined in the XY plane, and in some embodiments separable in the Z direction.

Figure 2:
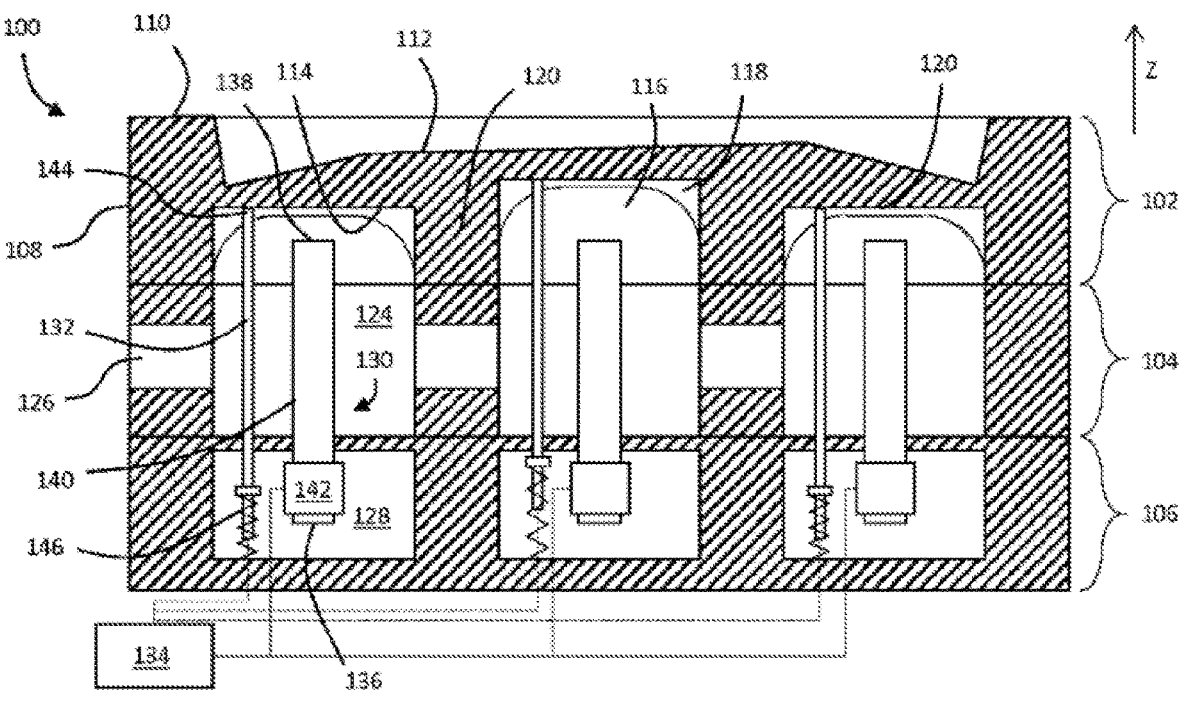
FIG. 2 is a schematic section view of the mould tool of FIG. 1 along line II-II.

Referring to FIG. 2, the mould tool 100 comprises three layers:

A mould layer 102;

An exhaust layer 104; and,

A utilities layer 106.

The mould layer 102 extends in the XY-plane. It defines a series of sidewalls 108 describing an outer perimeter. The mould layer further defines a mould face 110 which defines at least one mould profile 112 on a first surface thereof. The mould face 110 faces away from the other layers 104, 106 and in the Z direction. In this embodiment, the mould profile 112 is a cavity.

Opposite the mould face 110 there is provided a "back face" or temperature control face 114. The temperature control face 114 faces in the opposite direction to the mould face 100.

A plurality of fluid chambers 116 are defined in the mould layer, in the form of recesses or concave formations. In this exemplary embodiment there are 9 such chambers bounded by the temperature control face 114 in a 3×3 configuration. The chambers are separated by sidewalls 120 extending from the temperature control face 114 in a honeycomb-like pattern. It will be noted that although the chambers 116 are distinct, and not in fluid communication with each other in the mould layer 102, they are tessellated to form a grid, or "pixelated" mould layer 102. In the Z direction (FIG. 1), it can be clearly seen that the mould profile 112 spans multiple chambers 116.

Within each of the chambers 116, there is provided a temperature control face rib structure 118. The ribs 118 have arched-shaped concave formations facing away from the temperature control face 114. These arch structures are similar to those described in WO2014/023942. Each rib structure 118 is formed of two perpendicular concave ribs which meet at an impingement region 122 on the temperature control face 114 and each extend to the sidewalls 120.

The exhaust layer 104 comprises a plurality of exhaust chambers 124 which are in fluid communication with each other and with an exhaust port 126.

The utilities layer 106 is on the opposite side of the exhaust layer 104 to the mould layer 102 and comprises a plurality of chambers 128.

The mould tool further comprises a plurality of temperature control assemblies 130, a plurality of thermocouples 132 and a controller 134.

The temperature control assemblies 130 comprises a conduit 140 having an inlet 136 connected to a source of pressurised air, and an outlet 138. Each temperature control assembly 130 comprises an in-line fluid heater 142 which is configured to selectively heat the fluid passing through the conduit 140.

The thermocouples 132 are generally elongate and define a tip 144. The thermocouple 132 is configured to measure the temperature of a component with which the tip 144 is in contact. Each thermocouple 132 is mounted via a resilient element 146 as will be described below.

The controller 134 will not be described in detail, but it will be understood that it is configured to receive a feedback input from the thermocouple representative of the temperature of the tip 144, and to control both the heater 142 and flow rate of fluid into the inlet 136 in response. For example, provided with a set point at which the controller 134 is configured to reach, it will read the temperature of the thermocouple 132 and provide a heating or cooling response. Specifically:

if the thermocouple reading is below the set point, the flow rate is set to a first level and the heater 142 activated to provide a heating flow from the outlet 138; and, if the thermocouple reading is above the set point, the flow rate is set to a second level (higher than the first) and the heater 142 deactivated to provide a cooling flow from the outlet 138.

In this way, the controller 134 provides closed-loop control.

The temperature control assemblies 130 are mounted in the chambers 128 of the utilities layer 106. The thermocouples 132 are also mounted to the utilities layer 106, but via the resilient elements 146. The thermocouples 132 are resiliently biased in the Z direction away from the utilities layer 106.

The exhaust layer 104 is assembled on to the utilities layer 106 in the Z direction. The temperature control assemblies 130 and thermocouples 132 project through the exhaust layer 104, and specifically through the exhaust chambers 124 thereof. The temperature control assemblies 130 and thermocouples 132 project out of the exhaust layer 104.

The mould layer 102 is assembled on to the exhaust layer 104 in the Z direction. Assembly of the mould layer 102 places the temperature control surface 114 in contact with the thermocouples 132 which thereby compresses the resilient elements 146. This ensures that regardless of the geometry of the mould layer, and the Z-position of the temperature control surface 114, the thermocouples 132 remain in contact therewith.

Upon assembly, each of the outlets 138 from the temperature control assemblies 130 are directed towards a respective impingement region 120 on the temperature control face 114. Therefore the flow therefrom impinges on a respective impingement region 120 to transfer thermal energy between the fluid and the temperature control surface 114 (the direction of energy flux being dependent upon the temperature difference between the two, and therefore whether the system is "heating" or "cooling").

It will be understood that by using such a system, the temperature of the workpiece adjacent the mould profile 112 can be controlled by the controller 134.

It will also be understood that in use, the above system can be mirrored to provide a tool assembly with the mould profile facing in the −Z direction. Two such mould tool assemblies can form a single mould tool. It will also be understood that although the "Z" direction is shown as vertically oriented on the page, such systems may be oriented differently. For example, in an injection moulding machine the "Z" direction may be horizontal. Therefore the "Z" direction is understood to be a local axis of the layered mould tool and does not limit the present invention to any particular orientation in use.

They "layers" as defined above are described as being individual and separable, although it will be understood that "layers" may be defined in functional terms alone—i.e. the exhaust layer 104 and utilities layer 106 may be combined into a single, unitary utilities and exhaust layer.

What is important is that the layer defining the mould face can be separated from the other layer(s) and replaced with e.g. a layer having a different mould profile.

The First Embodiment

Referring to FIGS. 3 to 7, a mould layer assembly 200 in accordance with the present invention is shown. The mould layer assembly 200 is particularly well suited for mould cavity profiles with a low Z variation—i.e. pseudo 2D shapes (although it will be understood that it can be adapted for other shapes). The mould layer assembly 200 is used in a mould tool of the type described above (mould tool 100) in place of the mould layer 102. The X, Y and Z directions shown are equivalent to those with respect to the above mould tool 100.

Figure 4:
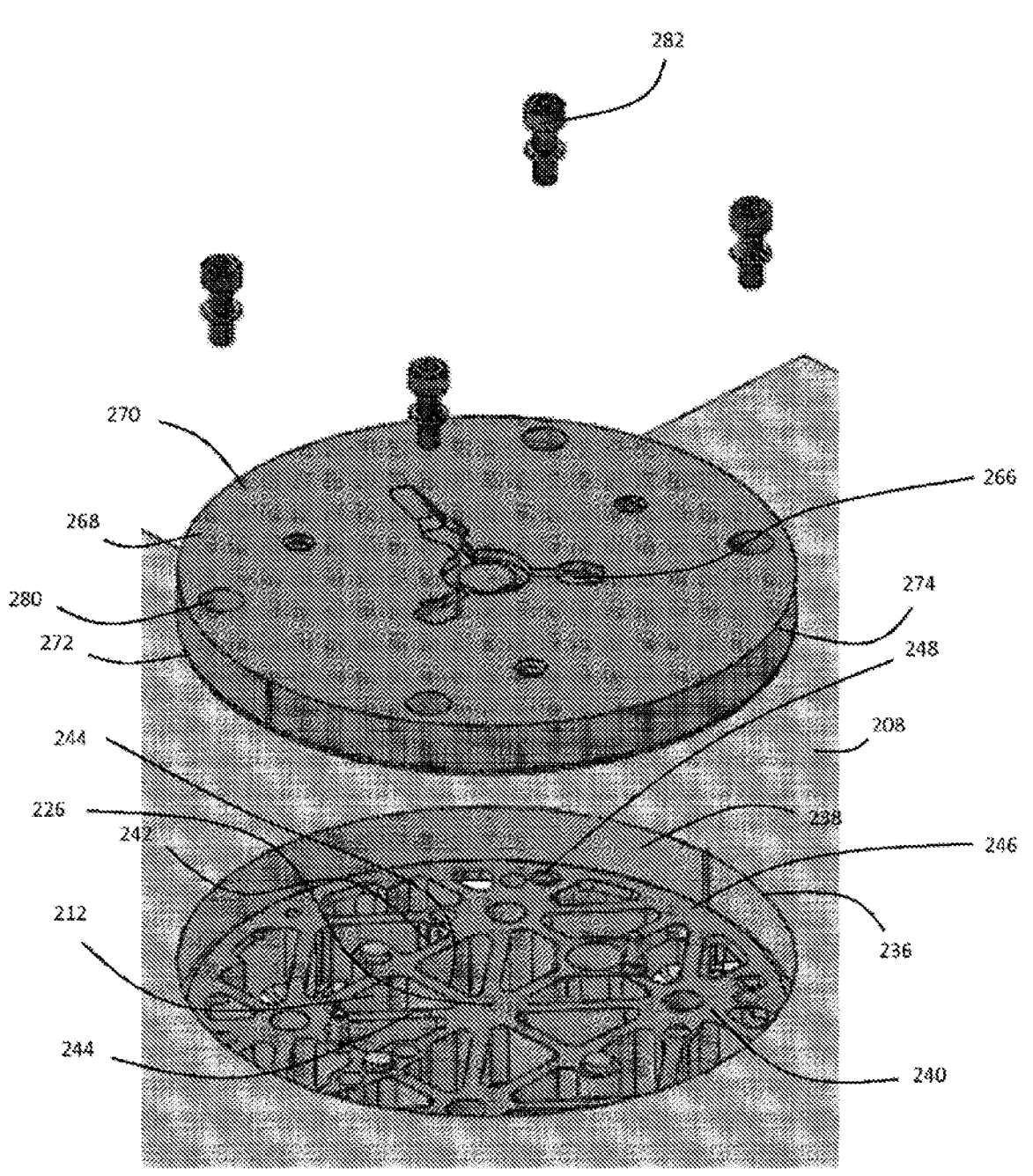
FIG. 4 is a detail view of region IV of FIG. 3.
Figure 5:
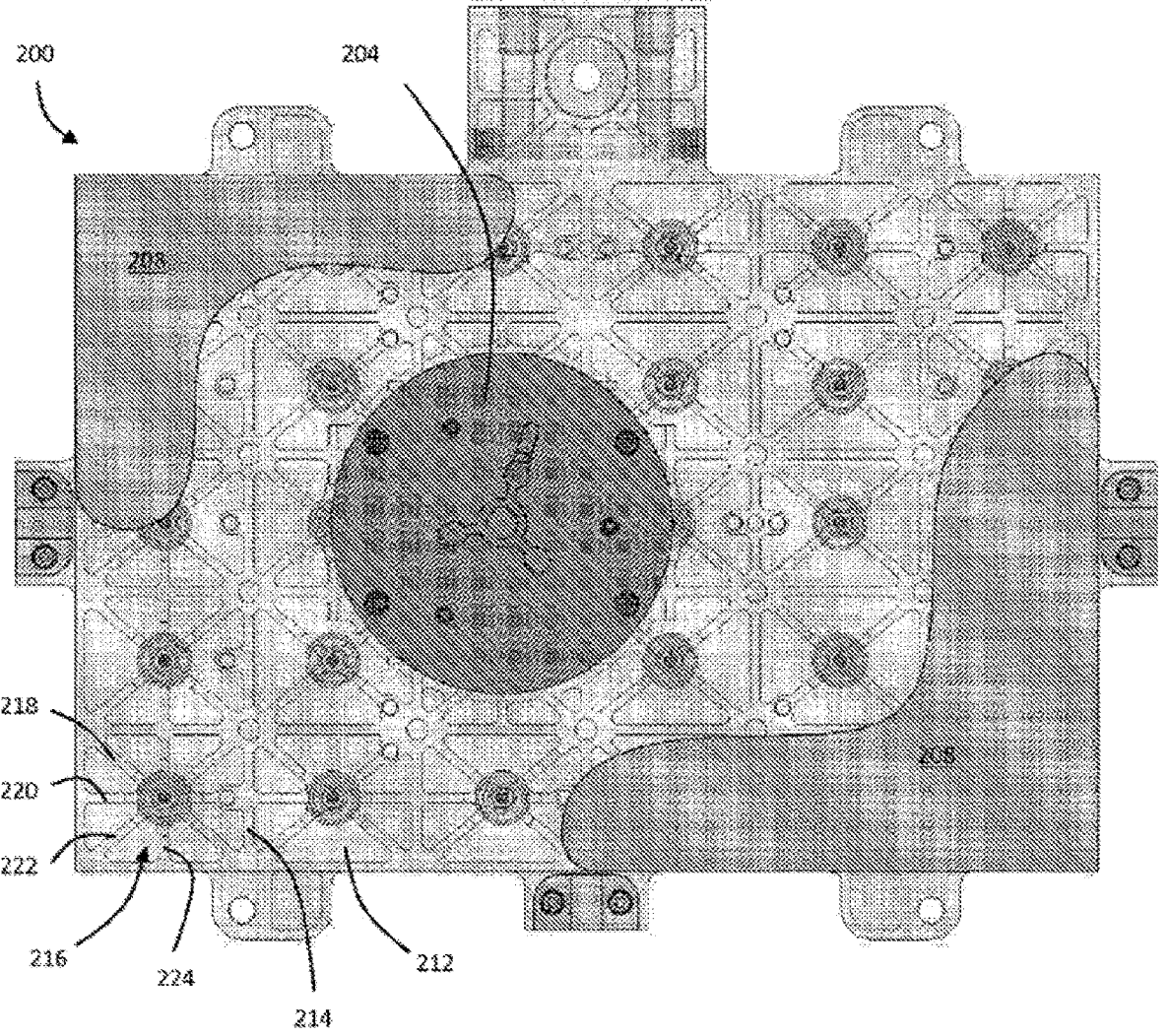
FIG. 5 is a plan view of the mould layer assembly of FIG. 3.
Figure 6:
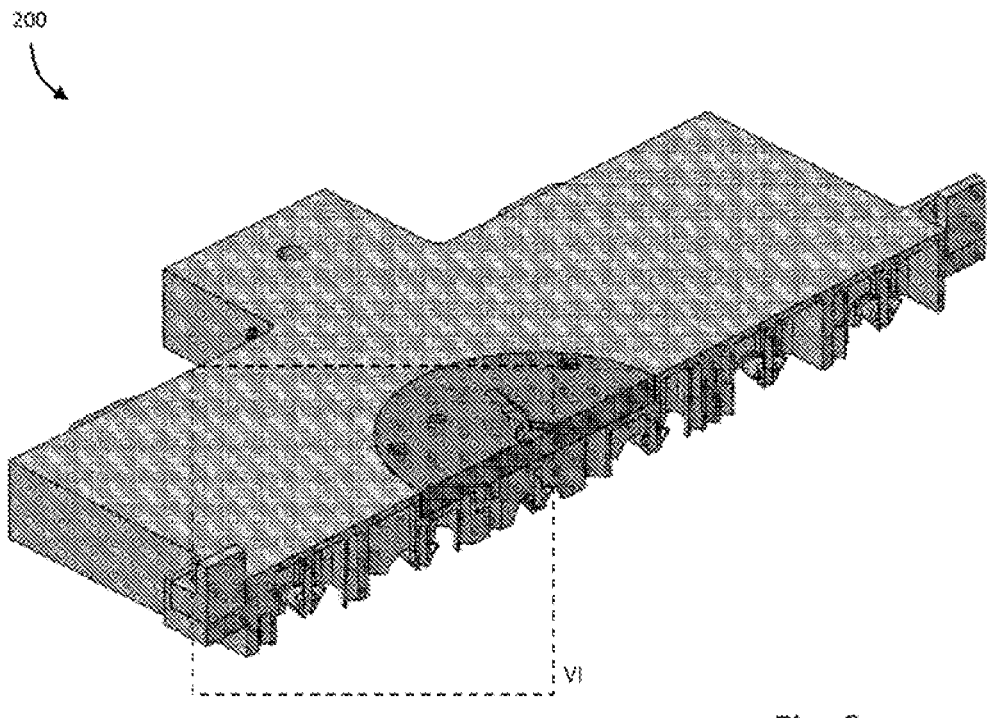
FIG. 6 is a sectioned perspective view of the mould layer assembly of FIG. 3.
Figure 7:
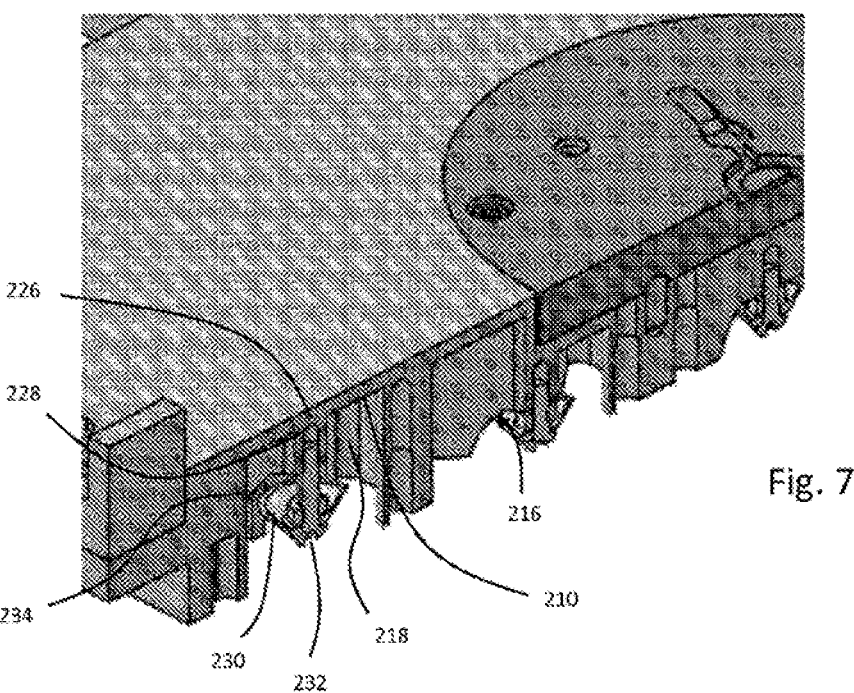
FIG. 7 is a detail view of region VI of FIG. 6.

The mould layer assembly 200 comprises a carrier 202 and an insert 204. The carrier 202 extends in the XY-plane. It defines a series of sidewalls 206 describing an outer perimeter. The carrier 202 defines a contact face 208 facing in the +Z direction and a "back face" or temperature control face 210 facing in the opposite, −Z direction (FIG. 4). The temperature control face 210 faces in the opposite direction to the mould face 100.

A plurality of fluid chambers 212 are defined in the carrier 202, in the form of recesses or concave formations. These are shown best in FIG. 4, which is a plan view in the −Z direction but with the top, planar layer of the carrier 202 partially removed to expose the structure underneath. In this exemplary embodiment there are 30 such chambers bounded by the temperature control face 210 in a 6×5 configuration. The chambers are separated by sidewalls 214 extending from the temperature control face 210 in a honeycomb-like pattern. It will be noted that although the chambers 212 are distinct, and not in fluid communication with each other in the carrier 202, they are tessellated to form a grid, or "pixelated" mould layer assembly 202. The chambers 212 are generally rectangular in shape, equally sized and tessellated.

Within each of the chambers 212, there is provided a temperature control rib structure 216. Each rib structure 216 comprises four concave arch-shaped ribs 218, 220, 222, 224 which each have a concave formation facing away from the temperature control face 210. These arch structures are similar to those described in WO2014/023942. The ribs 218, 220, 222, 224 cross at an impingement region 226 on the temperature control face 114 and each extend to the sidewalls 214.

At the impingement region 226 there is provided a diffuser boss 228 which receives a diffuser 230. The diffuser is a generally tapered structure (conical in this embodiment) having a first end 232 tapering outwardly to a second, wider end 234 towards the temperature control face 210. In this embodiment the impingement region 226 and diffuser 230 are in the geometric centre of the chambers 212.

Figure 3:
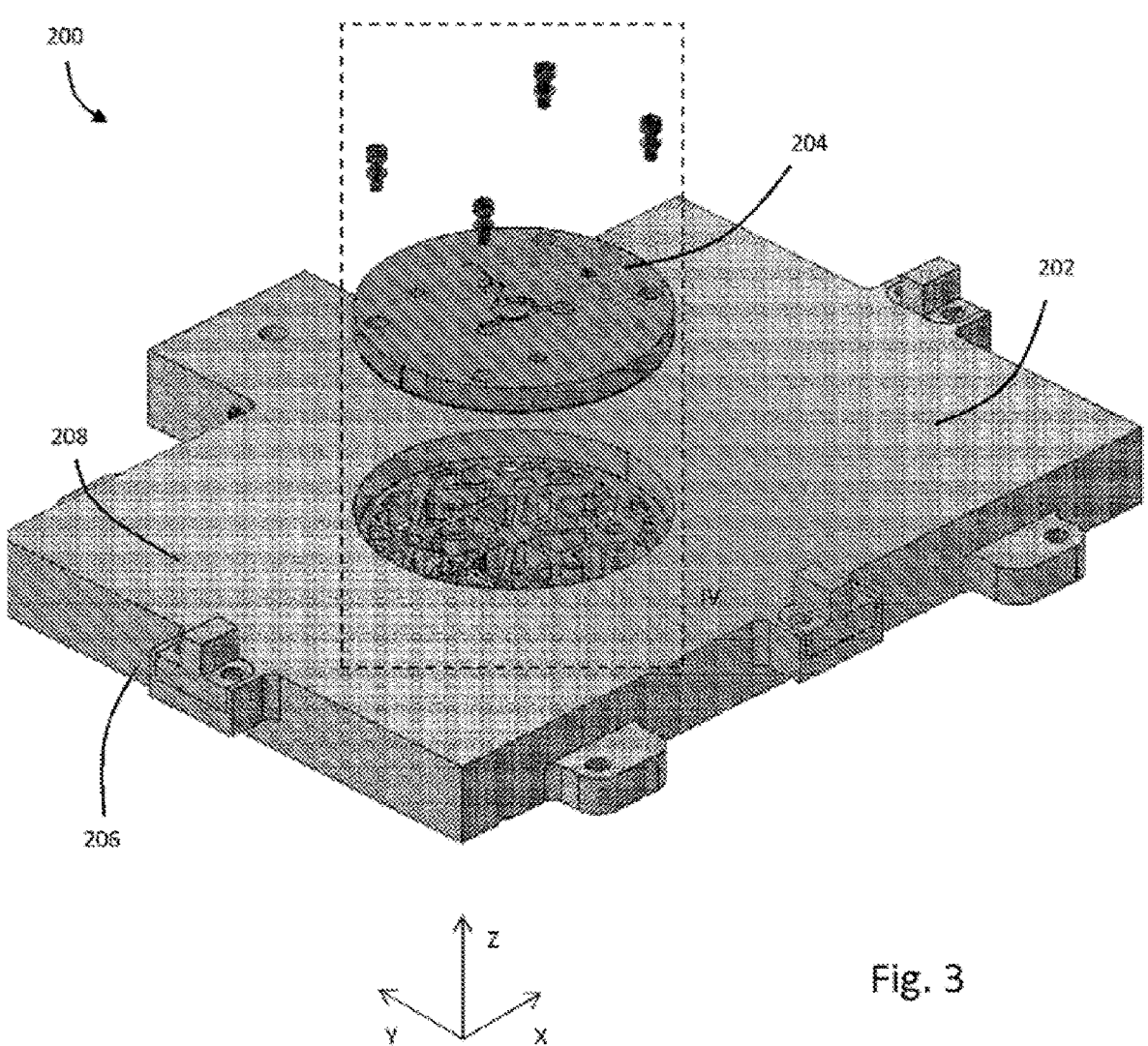
FIG. 3 is an exploded perspective view of a first mould layer assembly in accordance with the present invention, for use with the mould tool of FIG. 1.

Referring to FIGS. 3 and 4, the carrier 202 defines an insert cavity 236 in the contact face 208. The insert cavity 236 is circular in this embodiment (but may be any other shape as required). The insert cavity 236 is defined by a sidewall 238 which extends from the contact face 208 to the temperature control face 210. In other words, the insert cavity is in communication with the fluid chambers 212 on the opposite side of the carrier 202.

It will be noted that the formation of the insert cavity 236 provides an insert support surface 240, which has several apertures exposing the fluid chambers 212. The support surface 240 is generally parallel to the contact face 208 (i.e. in the XY plane) and is defined by:

Upper surfaces 242 of the chamber sidewalls 214;
Upper surfaces 244 of the ribs 218, 220, 222, 224; and,
An annular support surface 246 adjacent to, and inboard of, the sidewall 238.

Four threaded bores 248 are defined on the support surface 240.

The insert 204 comprises a circular body 268 having a first side 270, a second, opposite side 272 and an outer sidewall 274. The body 268 defines four fixing holes 280. The insert body 268 defines at least one mould profile 266 on the first surface 270 thereof. In this embodiment, the mould profile 266 is a cavity.

The insert 204 is placed into the insert cavity 236 such that the outer sidewall 274 of the insert 204 and the sidewall 238 of the cavity 236 abut. Mechanical fasteners 282 secure the insert 204 to the carrier 202. The second surface 272 of the insert 204 is supported by the support surface 240, and importantly forms part of the temperature control surface of the assembled mould layer because it is in thermal contact with the cavities 212.

The assembled mould layer assembly 200 is then assembled with a mould tool such as the tool 100 such that it, and therefore material placed against the mould profile 266 can be heated and cooled in a controlled manner as described above.

Should the user wish to change the mould cavity 266, the insert 204 can be removed from the carrier 202 (with or without separating the mould layer assembly 200 from the tool) and replaced.

Variations are possible on the first embodiment.

In this embodiment the insert 204 may be constructed from a first material, and the carrier 202 constructed from a different material. For example, the insert 204 may be constructed from a material which is more easily manufactured to provide the mould profile 266. The use of an insert 204 allows a more expensive material to be used to define e.g. the preferred surface finish of the mould profile 266 without needing to construct the entire mould layer from such a material. The insert 204 may also be manufactured by techniques which have practical size limitations—e.g. additive layer manufacturing, or turning.

It will also be noted that it is possible to have a plurality of inserts 204 in a single carrier 202.

It should be noted that although a one-part insert is described, a multiple-piece insert is also possible.

Although the mould profile 266 of the present invention only spans a single zone (i.e. fluid cavity 212), it is envisaged that mould profiles will span multiple zones/cavities.

Figures 8, 9, 10:
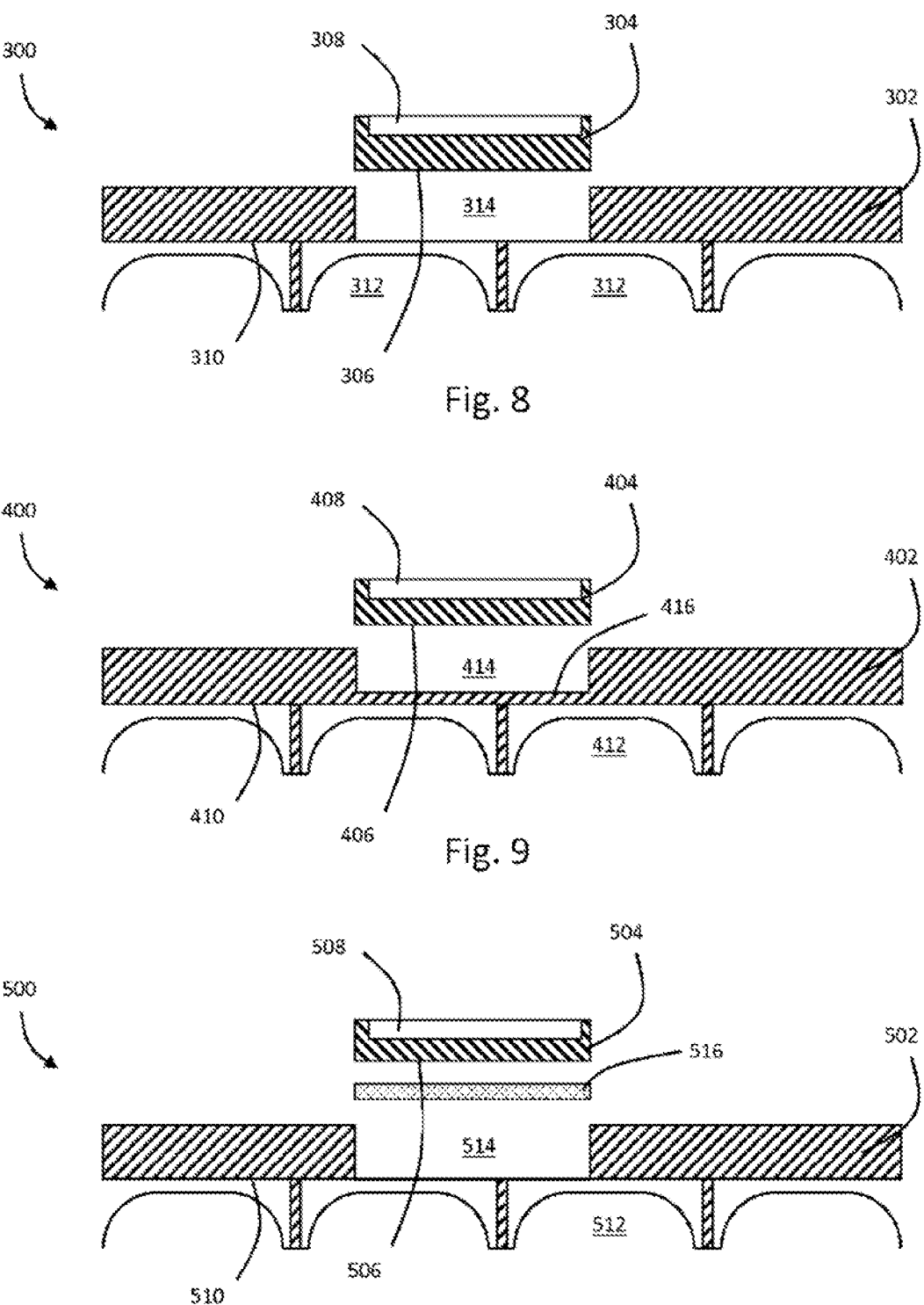
FIG. 8 is a schematic section view of the mould layer assembly of FIG. 3.
FIG. 9 is a schematic section view of a part of a first variation of the mould layer assembly of FIG. 3.
FIG. 10 is a schematic section view of a part of a second variation of the mould layer assembly of FIG. 3.

Referring to FIGS. 8 to 10, different carrier and insert configurations are shown.

FIG. 8 shows a mould layer assembly 300 having a carrier 302 and an insert 304 (shown as a single piece). The assembly 300 is similar to the assembly 200, inasmuch as a surface 306 of the insert 304 opposite a mould formation 308 forms part of a temperature control face 310 of the mould layer assembly 300. In other words, the surface 306 is in direct contact with fluid chambers 312 for temperature control because an insert cavity 314 is through-thickness in the carrier 302.

In FIG. 9, a mould layer assembly 400 comprises a carrier 402 and an insert 404. An insert cavity 414 is not through-thickness in this case, and defines an integral support plate 416 which defines a continuous temperature control face 410 with the carrier 402. The insert is in contact with the integral support plate 416 such that thermal energy is conducted through the integral support plate 416 to and from the insert and therefore the mould cavity 408.

In FIG. 10 a mould layer assembly 500 comprises a carrier 502 and an insert 504. An insert cavity 514 is through-thickness in this case (like the cavity 314) but a separate support plate 516 is provided which defines a continuous temperature control face 510 with the carrier 502. The insert is in contact with the support plate 516 such that thermal energy is conducted through the support plate 516 to and from the insert and therefore the mould cavity 508.

Use of a support plate 416, 516 provides less responsive heating and cooling of the mould cavity 408, 508, but does improve the structural performance and is better for supporting the moulding loads in compression.

The Second Embodiment

Referring to FIGS. 11 to 20, a mould layer assembly 600 in accordance with the present invention is shown.

The mould layer assembly 600 is particularly well suited for mould cavity profiles with a high Z variation—i.e. 3D shapes (although it will be understood that it can be adapted for other shapes). The mould layer assembly 600 is used in a mould tool of the type described above (mould tool 100) in place of the mould layer 102. The X, Y and Z directions shown are equivalent to those with respect to the above mould tool 100.

The mould layer assembly 600 comprises a mould face component 602 and a mould face support assembly 604.

Figure 12:
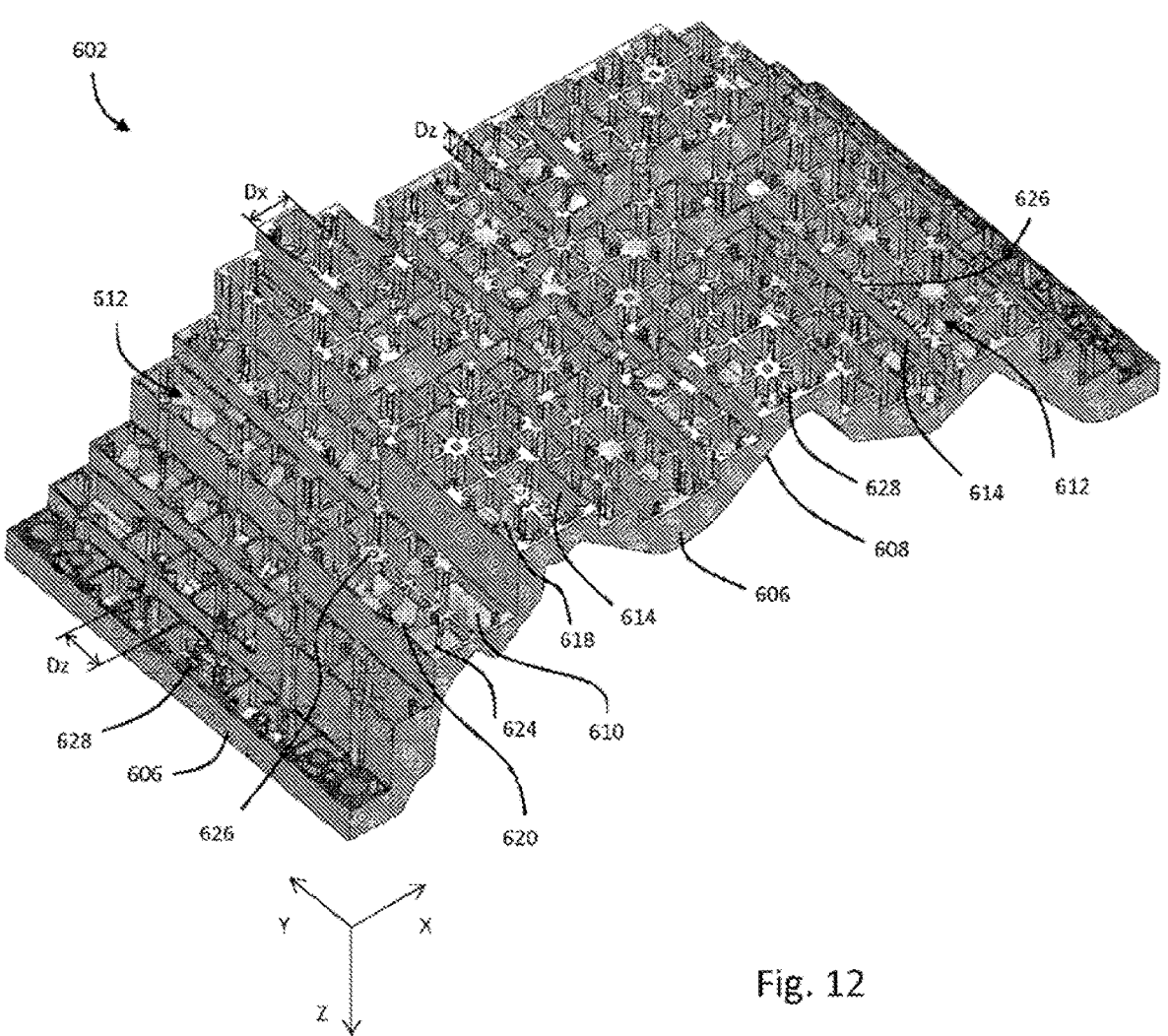
FIG. 12 is a perspective view of a first component of the mould layer assembly of FIG. 11.

The mould face component 602 is shown in FIG. 12, and comprises a series of sidewalls 606 describing an outer perimeter. The mould layer further defines a mould face 608 which defines at least one mould profile (not visible). The mould face 608 faces in the Z direction. In this embodiment, the mould profile is highly three dimensional.

Opposite the mould face 608 there is provided a "back face" or temperature control face 610. The temperature control face 610 faces in the opposite direction to the mould face 608. The temperature control face 610 varies in its Z position over the XY surface of the mould face 608 and follows the profile of the mould face 608 such that the distance between the mould face 608 and the temperature control face 610 is constant. In other words, the temperature control face 610 conforms to the shape of the mould face 608.

A plurality of fluid chambers 612 are defined in the mould face component. A plurality of chamber walls 614 project in the −Z direction from the temperature control face 610 which define a matrix of multiple tessellated rectangular chambers 612. The mould profile spans multiple chambers 612.

At some of the points where the chamber walls 614 meet there are provided threaded fastener bores 626. At the periphery of the mould face component 602 near the sidewalls 606 there are provided a plurality of open fastener bores 628 which pass through to the mould face 608.

Within each of the chambers 612, there is provided a temperature control face rib structure 618. The ribs 618 have arched-shaped concave formations facing away from the temperature control face 610. These arch structures are similar to those described in WO2014/023942. Each rib structure 618 is formed of concave ribs which meet at an impingement region 620 and each extend to the sidewalls 614. As is visible in FIG. 12, where the ribs meet (at the impingement region) diffuser mounting holes are provided for the mounting of diffusers as described above with respect to the second embodiment. The ribs 618 further define alignment features in the form of blind dowel holes 624.

The ends of the chamber walls 614 and ribs 618 distal to the temperature control face form a three-dimensional support profile 622. A section of this profile is shown from the side in FIG. 19.

The three dimensional support profile 622 comprises a series of orthogonally oriented, perpendicular surfaces which lie on either XY, ZX or ZY planes. The resulting three dimensional support profile 622 is stepped in three dimensions (although according to the invention simpler geometries are also envisaged). Importantly, the vertices of the three dimensional support profile 622 (where the surfaces meet) lie on a regular three dimensional grid having regular spacing. The distance between the grid points in three axes is Dx, Dy, Dz, where in this embodiment Dx=Dy=2Dx. Therefore the grid is finer in the Z direction.

The threaded fastener bores 626 form a grid in plan and are located 2Dx and 2Dy apart (although their Z position varies).

It will be noted that the chambers 612 are open to the three-dimensional support profile 622, giving the mould face component 602 a honeycomb-like appearance.

The mould face support assembly 604 comprises a plurality of building blocks or support elements 630. There are various types of support elements 630 which are used in constructing the mould face support assembly 604, and three examples are provided here.

Figures 13, 14:
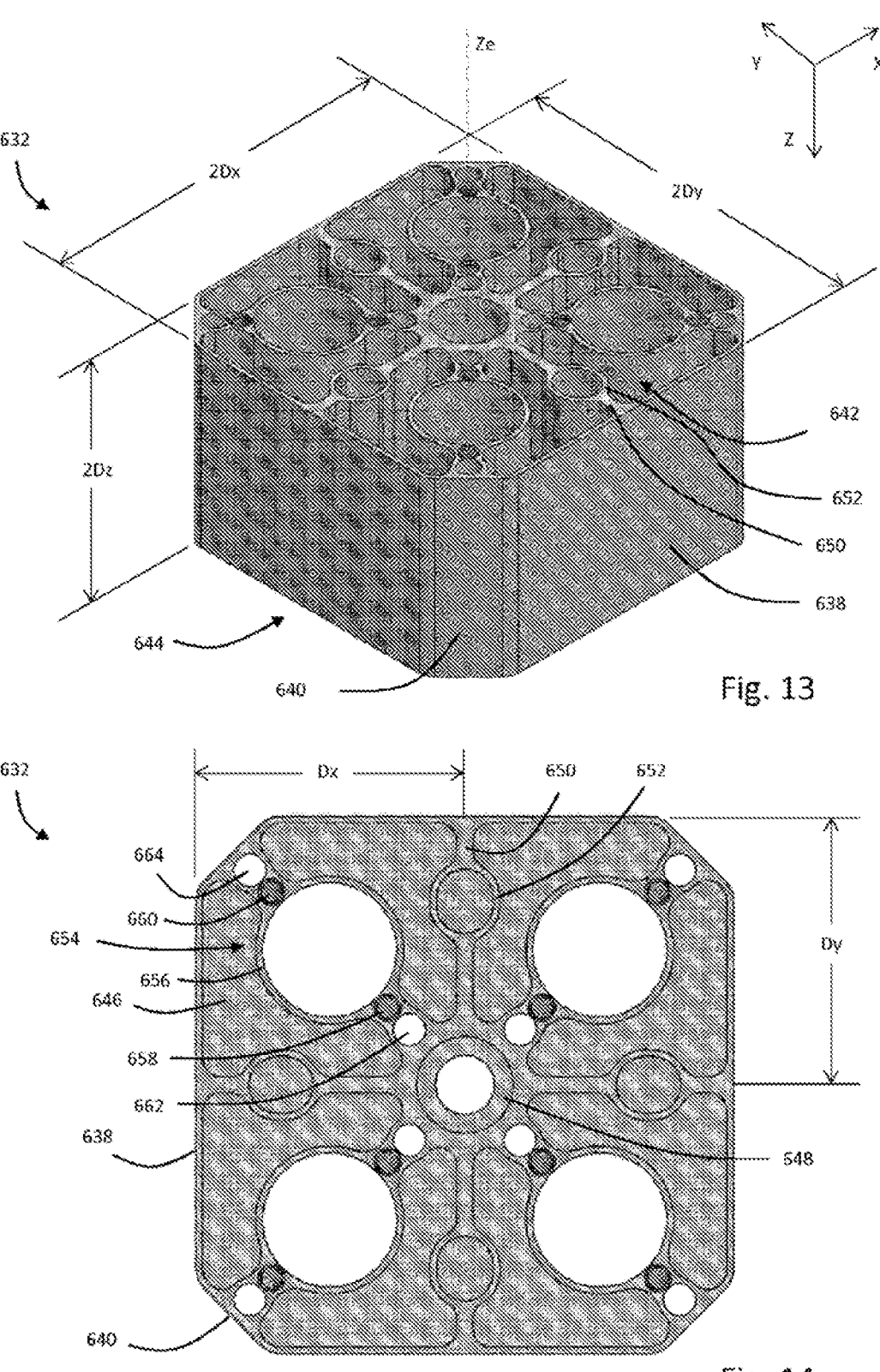
FIG. 13 is a perspective view of a second component of the mould layer assembly of FIG. 11.
FIG. 14 is a plan view of the component of FIG. 13.
Figures 15, 16:
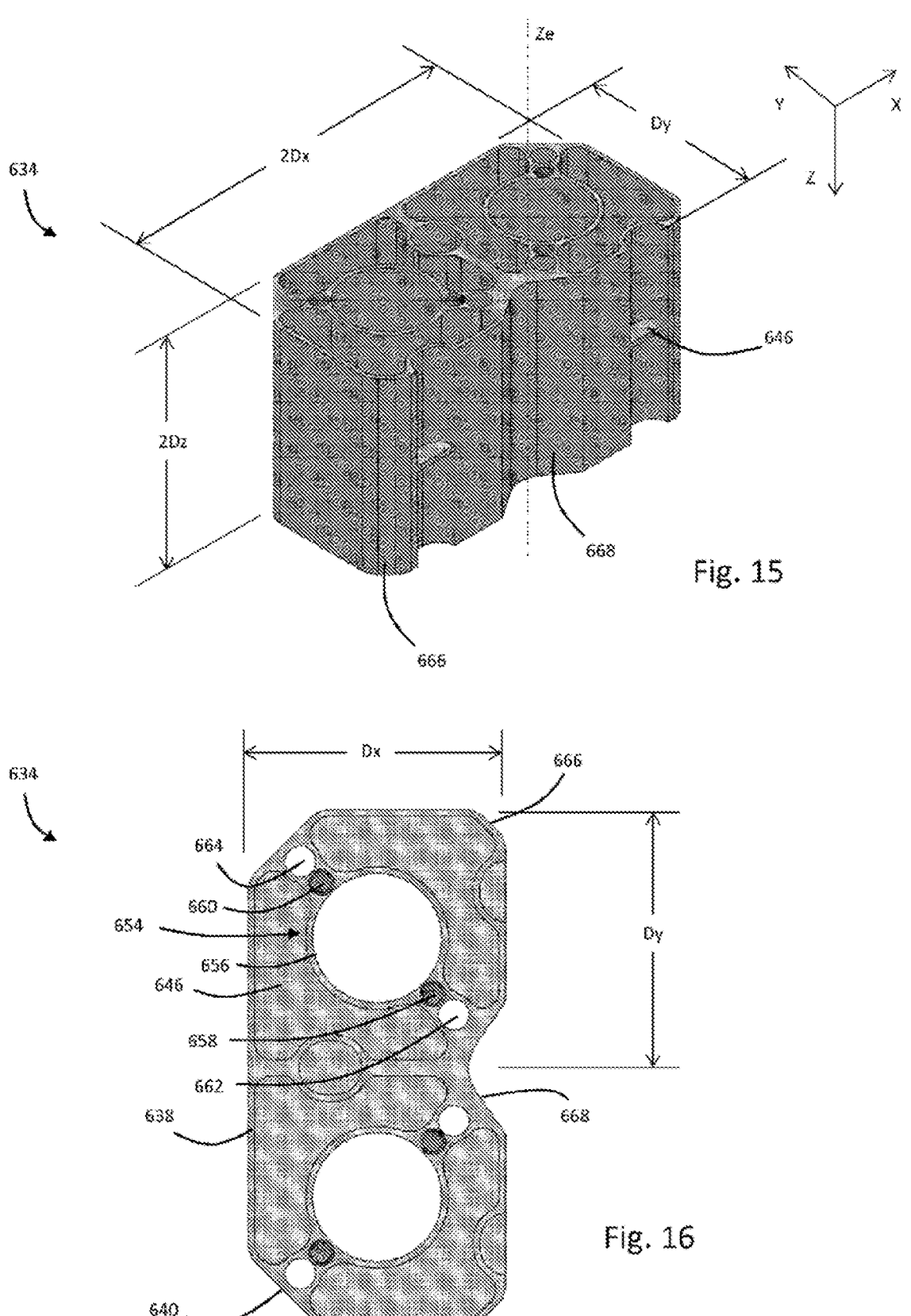
FIG. 15 is a perspective view of a third component of the mould layer assembly of FIG. 11.
FIG. 16 is a plan view of the component of FIG. 15.
Figure 17:
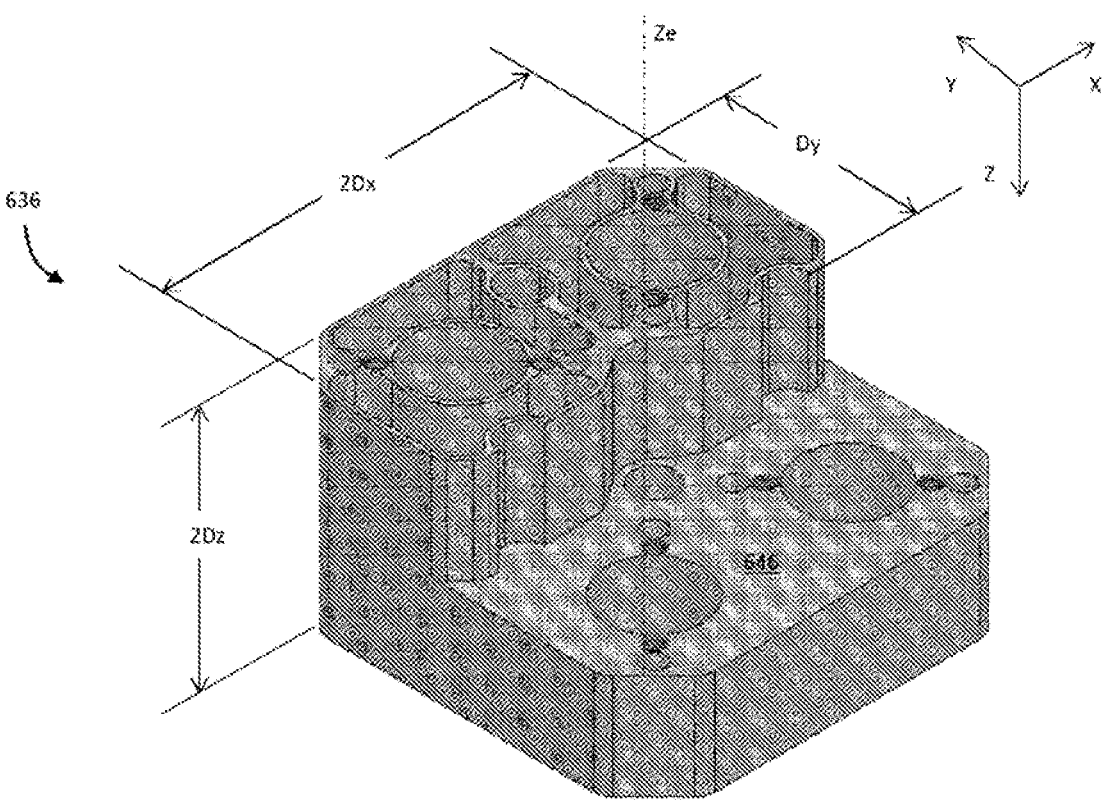
FIG. 17 is a perspective view of a third component of the mould layer assembly of FIG. 11.
Figure 18:
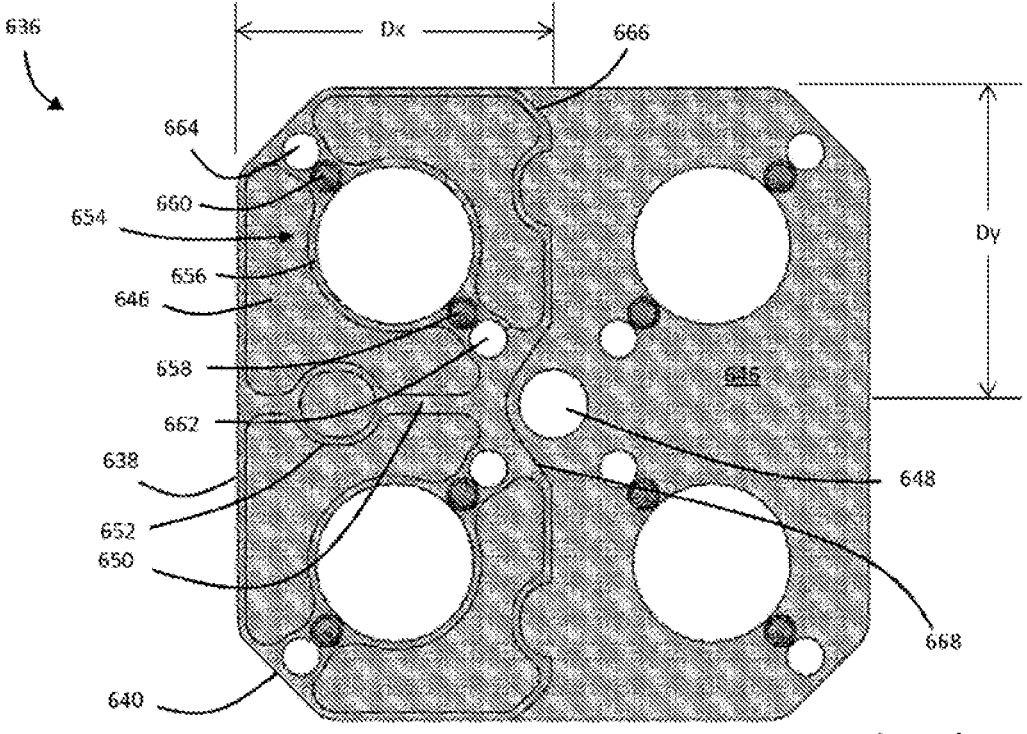
FIG. 18 is a plan view of the component of FIG. 17.
Figure 19:
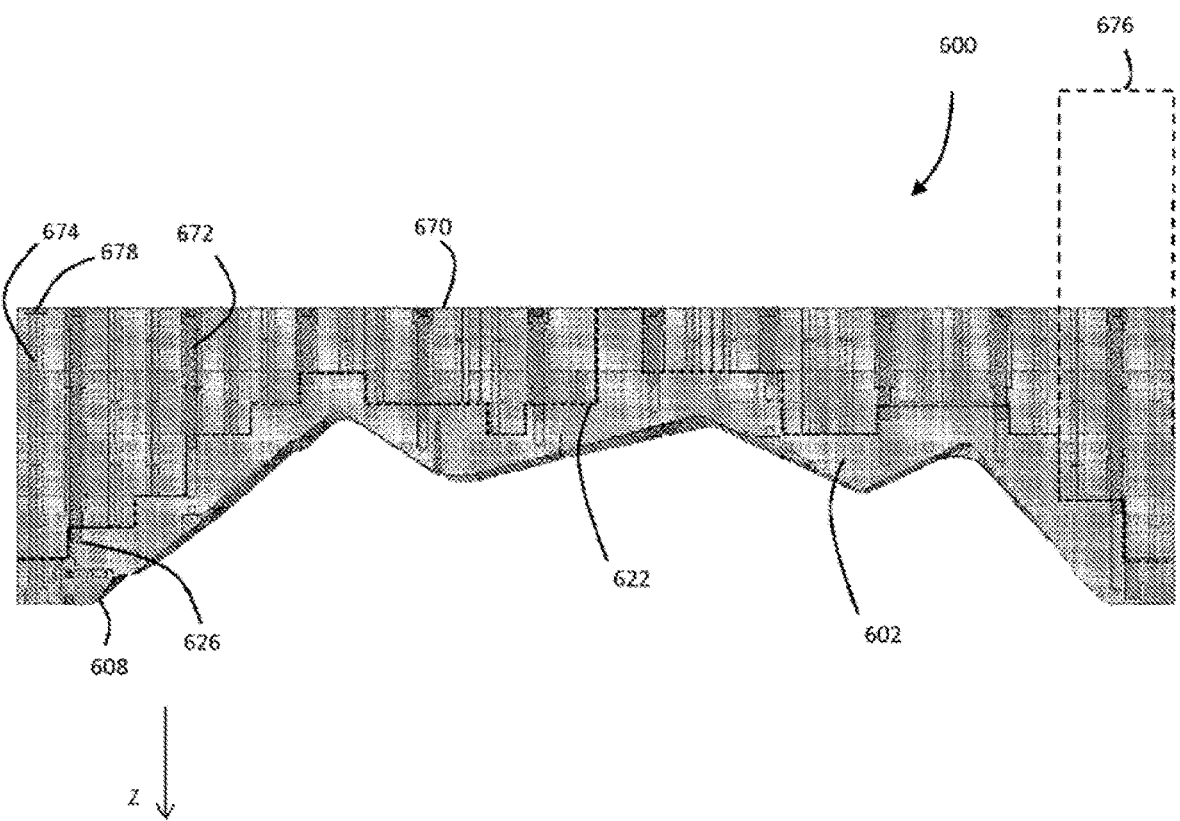
FIG. 19 is a section view of the mould layer assembly of FIG. 11 along line XIX-XIX.

A first type of support element 632 is shown in FIGS. 13 and 14, a second type of support element 634 is shown in FIGS. 15 and 16 and a third type of support element 636 is shown in FIGS. 17 and 18.

Turning to FIGS. 13 and 14, the first support element 632 is generally cuboidal in shape, with outer dimensions of 2Dx, 2Dx, 2Dz. The element 632 comprises a thin perimeter wall 638 which is generally square in plan, but with chamfers 640 at each corner. The perimeter wall 638 extends the entire Z dimension of the element 632. The element 632 has a first face 642 and a second face 644 which are open.

A central plate 646 extends across the XY plane of the element 632, midway between the faces 642, 644. The element 632 comprises a central tubular mounting boss 648 at its geometric centre defining a central axis Ze. Eight internal support structures extend from the boss 648 to the perimeter walls 638 as described below.

A set of four first support structures 650 extend from the boss 648 to the midpoint of each of the walls 638. The first support structures 650 thus extend in a radial direction and are oriented 90 degrees apart. Each support structure 650 is shaped as a wall with a fixing boss 652 defined at the midpoint thereof. Each fixing boss 652 is parallel to the central mounting boss 648. The central plate 646 extends across the fixing bosses 652 in this embodiment, although it can be machined out for the purpose described below.

A set of four second support structures 654 extend from the boss 648 to each corner of the element 632 (specifically to each chamfer 640). The second support structures 654 thus extend in a radial direction and are oriented 90 degrees apart. Each support structure 654 is shaped as a wall with a temperature control assembly conduit 656 defined at the midpoint thereof. Each temperature control assembly conduit 656 is parallel to the central mounting boss 648. The central plate 646 does not extend across the temperature control assembly conduit 656. On either side of the temperature control assembly conduit 656 there are provided location features in the form of an inboard blind dowel hole 658 and outboard blind dowel hole 660. On either side of the dowel holes 658, 660 there are provided inboard and outboard thermocouple conduits 662, 664 respectively. The central plate 646 does not extend across the thermocouple conduits 662, 664.

As can be seen in FIG. 13, the walls 638 and support structures 648, 650 extend to the first face 642 and a second face 644 forming respective web-like support surfaces in the XY-plane.

Turning to FIGS. 15 and 16, the second support element 632 is best described as "half-block" variant of the first support element 630, cut along the XZ plane through its entire X and Z thickness. Mid-chamfers 666 are provided, and an axial recess 668 is provided in place of the central tubular mounting boss 648, but all other features are the same (and are labelled as such).

Turning to FIGS. 17 and 18, the third support element 636 is best described as "three-quarter-block" variant of the first support element 630, cut along the XZ plane through its entire X width but only half its Z thickness (to the plate 646). Mid-chamfers 666 are provided, and an axial recess 668 is provided in place of the central tubular mounting boss 648 on one side of the plate 646, but all other features are the same (and are labelled as such).

Referring back to FIG. 11, it can be seen that a combination of different types of elements (including the elements 630, 632 and 634 described above) can be used to form the mould face support assembly 604 which extends between the three dimensional support profile 622 of the mould face component 602 and a flat, planar interface surface 670 which is parallel to the XY plane.

Figure 11:
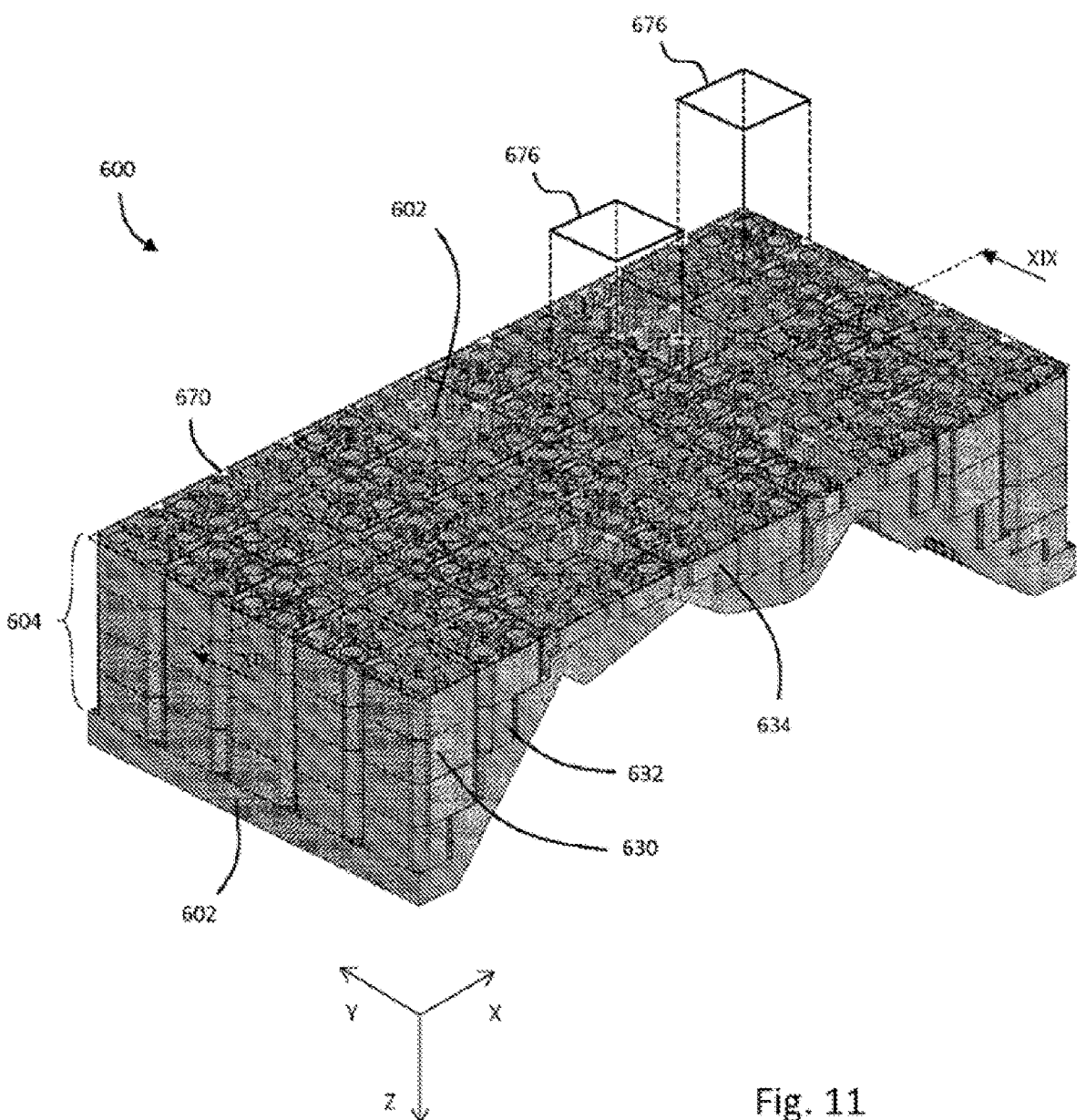
FIG. 11 is a perspective view of a second mould layer assembly in accordance with the present invention, for use with the mould tool of FIG. 1.

As shown in FIG. 11, the elements are used to build up the mould layer assembly 600 only to the point required by the furthest Z position of the mould face component 602 (i.e. the three dimensional support profile 622).

Dowel pins (not shown) are inserted into the blind dowel holes 624 on the mould face component 602. An element (630, 632, 634 depending on what is required) is then assembled to the mould face component 602. The projecting dowel pins engage the corresponding bores 658, 660 on the element, thus locating it in position. Dowel pins are used to stack subsequent elements.

It will be noted that in this embodiment, the elements 630, 632, 634 are arranged in columns 676. Two columns 676 are shown in FIG. 11 by extending the column corners in the −Z direction (it will be understood that the columns will not extend as far as the lines shown). In this embodiment, the elements of each column do not overlap with those in adjacent columns. Each column 676 extends from a set of four adjacent chambers 612 of the mould face component 602 in a 2×2 configuration. In this way, the stacked perimeter walls 638 of the elements extend in the −Z direction from the chamber walls 614 to transfer the moulding load.

Once the elements have been assembled, internal fastening bolts 672 through each column 676, and perimeter fastening bolts 674 can be used to secure the mould layer assembly 600 together. Each internal fastening bolt 672 is passed in the +Z direction from the planar interface surface 670, through the bosses 648 of the elements in a single column to engage the threaded fastener bores 626 in the back face of the mould face component 602 (se FIG. 19).

In addition, the blocks used at the perimeter (for example at the extreme left and right hand sides of FIG. 19) will have the central plate 646 extending across the fixing bosses 652 removed (e.g. by machining) to provide a through-bore through which the perimeter fastening bolts 674 can be passed. The perimeter fastening bolts 674 are passed from the mould face 608 in the −Z direction towards the planar interface surface 670 where they are secured with a nut 678 to clamp the perimeter columns.

Once the mould layer assembly 600 has been fully assembled, a machining process is used to skim, plane or grind the planar interface surface 670 to ensure it is completely flat. This removes the effect of e.g. tolerance stack which may result in an otherwise uneven surface.

The mould layer assembly is now ready to be assembled with the rest of the tool. As with the tool 100, the mould layer assembly 600 is assembled with a mould tool having a plurality of conduits of temperature control assemblies 130 and a plurality of thermocouples 132 projecting therefrom. The stacked elements 630, 632, 634 each define:

A passage for the passage of the temperature control assembly conduit 140, via the stacked temperature control assembly conduits 656 from the planar interface surface 670 directly to the impingement regions 620 in the Z direction; and, Two passages for the passage of the thermocouple 132, via the stacked thermocouple conduits 662, 664 from the planar interface surface 670 directly to the impingement regions 620 in the Z direction.

The user may select one or both of the thermocouple locations. As discussed above, the resiliently biased thermocouples contact the temperature control face 610 and are pushed back upon assembly.

Figure 20:
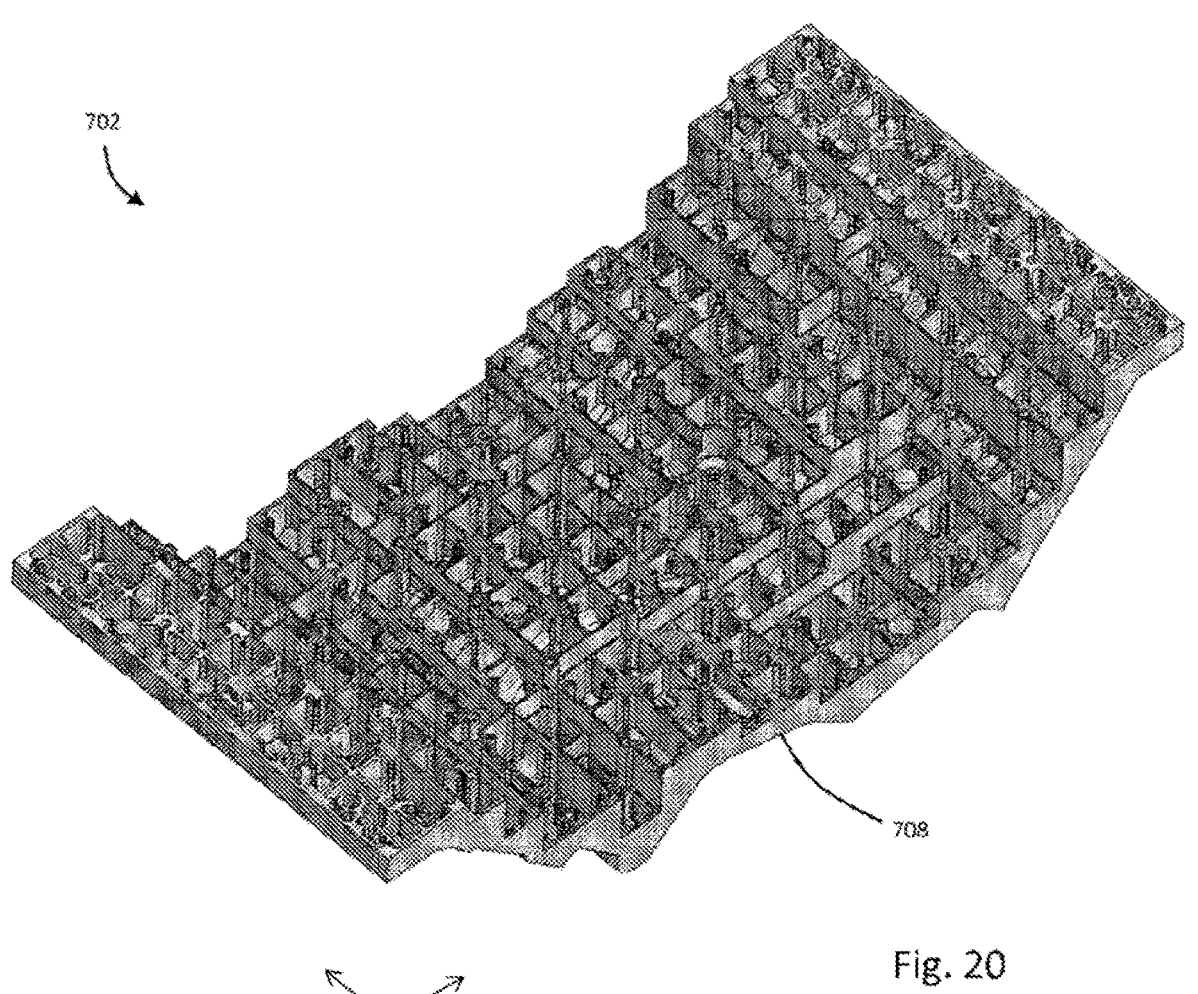
FIG. 20 is a perspective view of a component of a second mould layer assembly in accordance with the present invention, for use with the mould tool of FIG. 1.

Referring to FIG. 20, a section through an assembled mould tool 100 is shown Variations of the second embodiment are possible within the scope of the present invention. For example, Dx, Dy and Dz do not need to be equal. All three may differ, or two may be the same and one may differ. For example, Dy and Dx may be the same, and Dz different. This would provide non-cube elements. Although this would increase part variability, it would eliminate accidental incorrect orientation of the elements.

Exhaust fluid passes down through the elements. Although it is envisaged that the elements will be manufactured accurately enough to minimise leakage, seals or gaskets may be provided between adjacent elements in each column. In particular, the seals or gaskets may be positioned around the temperature control assembly conduit 656 (the exhaust gas typically returns in the annular space surrounding the temperature control assembly within the temperature control assembly conduit 656).

The Third Embodiment

Referring to FIG. 20, a mould face component 702 is shown which is the corresponding and mating component to the component 602. Unlike the component 602 which has a concave mould face 608, the mould face component 702 has a convex mould face 708. The mould face component 702 is build up to form a mould layer assembly in the same way as the assembly 600, and forms the opposite side of the mould tool.

It will be noted in the second and third embodiments, the elements 630, 632, 634 can be reused with different mould face component 602.

The invention claimed is:

1. A mould layer assembly comprising:
   a carrier defining a carrier mould contact face on a first side, and a temperature control face on a second side opposite the first, which temperature control face is separated into a plurality of tessellated temperature control zones, each zone comprising a fluid chamber at least partially defined by the temperature control face, the carrier defining an insert cavity overlapping a subset of the plurality of tessellated temperature control zones, and not overlapping a remainder of the plurality of tessellated temperature control zones, wherein the insert cavity is defined by a sidewall; and
   an insert defining a mould profile for forming a moulded article and an insert temperature control surface that is opposite the mould profile, the insert being disposed in the insert cavity of the carrier such that the insert overlaps the subset of the plurality of the tessellated temperature control zones and such that the insert temperature control surface is in direct thermal contact with the subset of the plurality of tessellated temperature control zones, the insert comprising an insert mould contact face adjacent the mould profile, the insert mould contact face being parallel and adjacent to the carrier mould contact face, wherein the insert does not extend past the sidewall when assembled in the insert cavity.

2. The mould layer assembly according to claim 1, wherein at least one of:
   the insert overlaps a plurality of the tessellated temperature control zones; and the mould profile overlaps a plurality of the tessellated temperature control zones.

3. The mould layer assembly according to claim 1, wherein the carrier comprises a support surface for supporting the insert in the insert cavity.

4. The mould layer assembly according to claim 3, wherein at least one of:
   the support surface comprises a peripheral support around the insert cavity; and
   the fluid chambers are defined by chamber sidewalls, and wherein the support comprises ends of the chamber sidewalls.

5. A mould layer assembly according to claim 3, wherein the fluid chambers contain ribs, and wherein the support surface comprises ends of the ribs.

6. The mould layer assembly according to claim 5, wherein chamber sidewalls form a rectangular lattice, and wherein the ribs extend at an angle to the chamber sidewalls.

7. The mould layer assembly according to claim 5, wherein the ribs define concave formations facing away from the insert.

8. The mould layer assembly according to claim 7, wherein the ribs are arch-shaped, such that a plurality of ribs extend from the chamber sidewalls to an impingement region.

9. The mould layer assembly according to claim 1, wherein the carrier mould contact face and the insert mould contact face are co-planar.

10. The mould layer assembly according to claim 1, wherein the remainder of the plurality of tessellated temperature control zones surround the subset of the plurality of tessellated temperature control zones.

11. The mould layer assembly according to claim 1, wherein the plurality of tessellated temperature control zones are rectangular and arranged in a grid.

12. A mould tool comprising:
   a plurality of temperature control assemblies each comprising a heater; and,
   a mould layer assembly according to claim 1,
   wherein the temperature control assemblies are controllable to individually heat each of the chambers.

13. The mould tool according to claim 12, wherein each of the temperature control assemblies comprises a fluid outlet directed into the respective chamber, such that at least one of:
   each of the temperature control assemblies is configured to alternately heat and cool a respective chamber with fluid from the outlet; and
   at least one of the fluid outlets is directed towards the insert.

\* \* \* \* \*